United States Patent [19]

Gore

[11] Patent Number: 4,920,725
[45] Date of Patent: May 1, 1990

[54] SELF-GRIPPING HANGER DEVICE

[75] Inventor: Charles E. Gore, Colleyville, Tex.

[73] Assignee: Truswal Systems Corporation, Arlington, Tex.

[21] Appl. No.: 310,840

[22] Filed: Feb. 14, 1989

[51] Int. Cl.⁵ ............................................. F16B 9/00
[52] U.S. Cl. ....................................... 52/702; 52/704; 403/232.1
[58] Field of Search ................... 52/702, 703, 712–714, 52/704; 403/232.1, 193, 403, 187

[56] References Cited

U.S. PATENT DOCUMENTS

| | | | |
|---|---|---|---|
| 3,601,428 | 8/1971 | Gilb | 52/702 X |
| 3,633,950 | 1/1972 | Gilb | 52/702 X |
| 3,752,512 | 8/1973 | Gilb | 403/232.1 |
| 4,198,175 | 4/1980 | Knepp et al. | 52/702 X |
| 4,423,977 | 1/1984 | Gilb | 403/232.1 |
| 4,525,972 | 7/1985 | Palacio et al. | 52/702 X |
| 4,560,301 | 12/1985 | Gilb | 403/232.1 |
| 4,802,786 | 2/1989 | Yauger et al. | 52/702 X |

FOREIGN PATENT DOCUMENTS 862969 2/1971 Canada ................... 52/702

Primary Examiner—Richard E. Chilcot, Jr.
Attorney, Agent, or Firm—W. Kirk McCord

[57] ABSTRACT

A hanger device for connecting a first wood member, such as a wood joist, to a second wood member, such as a roof or floor truss of a building structure, such that the first wood member is oriented substantially perpendicualar to the second wood member. The device is comprised of a relatively flat central member having first and second opposite ends and first and second opposite sides; a relatively flat base member extending perpendicularly outward from the central member adjacent to the first end thereof; a relatively flat flange member extending perpendicularly outward from the central member in an opposite direction from which the base member extends; and first and second walls protruding from the central member and base member in substantially the same direction as the base member. The first and second walls cooperate with the base member and central member to define a recessed region for receiving a portion of the first wood member. Respective inwardly facing surfaces of the first and second walls each have a plurality of projections extending into the recessed region for being embedded into the first wood member to attach the first wood member to the hanger device. The projections are preferably formed by extruding selected portions of the first and second walls into the recessed region to define respective openings in the walls adjacent to the corresponding projections. The projections are oriented diagonally with respect to a major axis of the corresponding wall to enhance the gripping action of the hanger device.

27 Claims, 2 Drawing Sheets

SELF-GRIPPING HANGER DEVICE

FIELD OF THE INVENTION

This invention relates to hanger devices used in building construction and in particular to a hanger device for supporting wood framing members in a building structure.

BACKGROUND OF THE INVENTION

Construction members used in commercial/industrial applications typically include a plurality of wood framing members, such as wood joists, spaced at predetermined intervals and supported by wood support members, such as wood trusses. Metal hanger devices are used to connect the wood framing members to the support members, such that the framing members are oriented perpendicular to the major axes of the support members.

DESCRIPTION OF THE PRIOR ART

According to prior practice, panel hangers typically have a saddle-shaped portion for receiving an end portion of a wood framing member, such as a wood joist, and a flange for connecting the hanger to a support member, such as a truss. The end portion of the framing member is positioned between first and second opposite walls of the hanger. Both walls have a plurality of openings therein for allowing the hanger to be nailed or otherwise attached to corresponding opposite major surfaces of the framing member to secure the framing member to the hanger. The use of nails or other attachment members to secure the framing member to the hanger increases both the labor and material costs associated with the building structure.

OBJECTS OF THE INVENTION

It is, therefore, the principal object of the present invention to provide an improved hanger device for connecting wood framing members to wood support members in a building structure.

Another object of the invention is to provide a self-gripping hanger device to which a wooden framing member can be secured without the need for nails or other external attachment members.

SUMMARY OF THE INVENTION

These and other objects are accomplished in accordance with the present invention wherein a device for connecting a first wood member to a second wood member of a building structure such that the first wood member is oriented substantially perpendicular to the second wood member is provided. The device is comprised of a relatively flat central member, a base member and first and second oppositely positioned walls protruding from the central member to define a recessed region for receiving a portion of the first wood member, and means for attaching the device to the second wood member. Respective inwardly facing surfaces of the first and second walls each have at least one projection extending into the recessed region for being embedded into the first wood member to attach the first wood member to the device.

In one aspect of the invention each of the projections is formed by extruding selected portions of the corresponding wall into the recessed region to define a corresponding opening in the wall adjacent to the corresponding projection. In one embodiment each of the projections has a curved major surface extending into the recessed region. In another embodiment the curved major surface of each projection defines a portion of a spherical surface and the corresponding opening has a substantially semi-circular cross-section. In another aspect of the invention the projections are oriented diagonally relative to the respective major axes of the corresponding walls.

In the preferred embodiment each of the walls has a plurality of projections extending into the recessed region. The curved major surface of each projection is oriented such that a chord extending between end points on a curve defining an intersection between the projection and the corresponding wall is oriented diagonally with respect to a major axis of the corresponding wall. The opening adjacent to each projection is disposed between a curved distal edge of the corresponding projection and the corresponding chord. The means for attaching the device to the second wood member is comprised of a flange member, which protrudes from the central member in a direction opposite from the direction in which the base member and walls protrude from the central member. The flange member has openings for receiving a nail or the like to secure the device to the second wood member.

BRIEF DESCRIPTION OF THE DRAWINGS

Further objects and advantages of the invention will be apparent from the Detailed Description and Claims when read in conjunction with the accompanying drawings wherein:

DETAILED DESCRIPTION OF THE PREFERRED EMBODIMENT

In the description which follows like parts are marked throughout the specification and drawings, respectively. The drawings are not necessarily to scale and in some instances proportions have been exaggerated in order to more clearly depict certain features of the invention.

Referring to FIGS. 1-4, a portion of a building support structure is illustrated. A truss 10 is comprised of substantially parallel top and bottom chords 12 and 14, respectively, which are interconnected by wooden web members 16 extending diagonally between top and bottom chords 12 and 14. Metal toothed connector plates 18 or the like are used to secure web members 16 to top and bottom chords 12 and 14 at the corresponding truss joints in the conventional manner.

Figure 1:
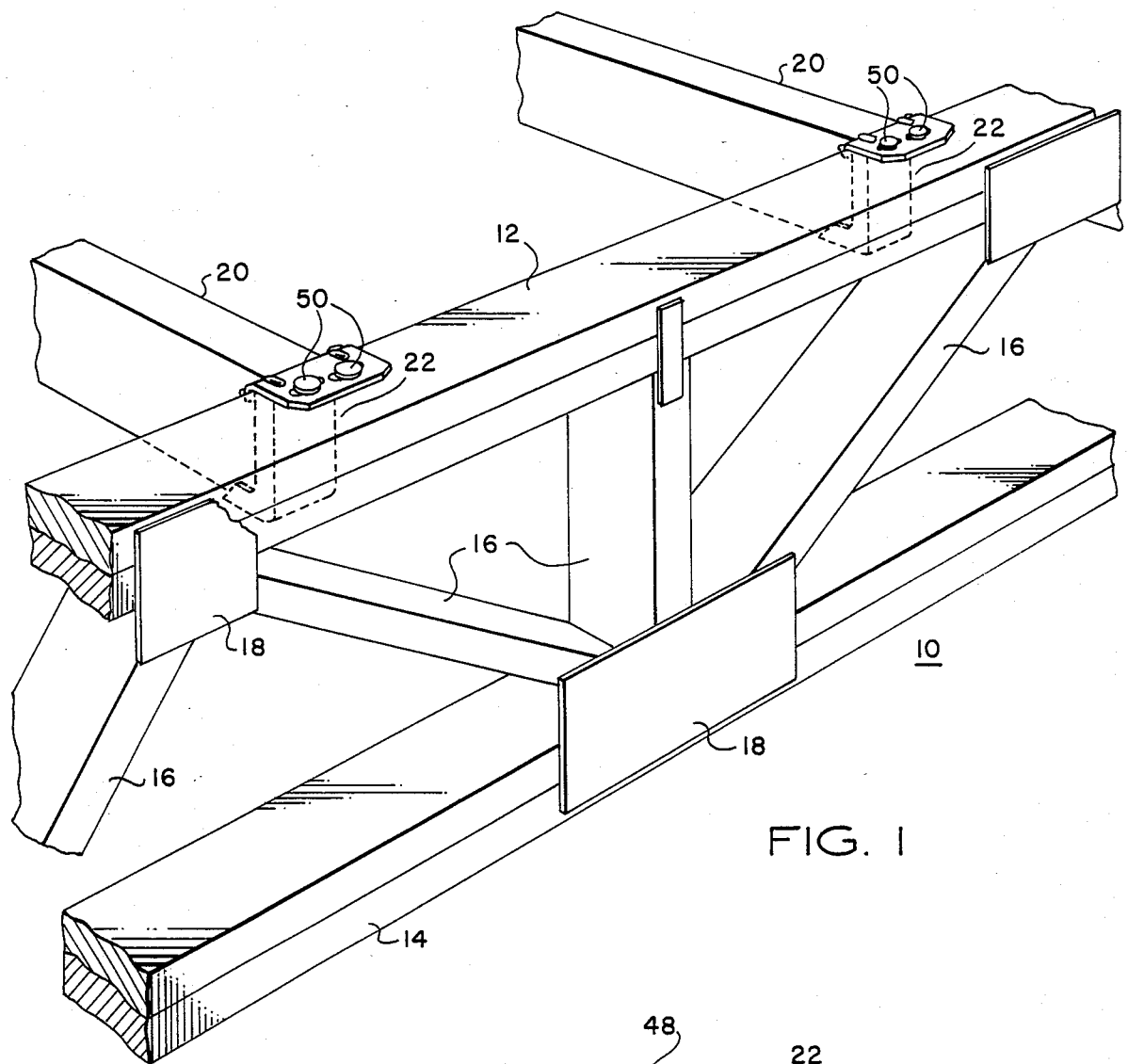
FIG. 1 is a perspective view of a floor or ceiling truss, illustrating the attachment of wood joists to the truss by means of the hanger device according to the present invention.

In one type of commercial/industrial building structure, a portion of which is shown in FIG. 1, a plurality of trusses 10 are arranged in parallel relationship and a plurality of wood joists 20 are also disposed in parallel relationship between adjacent trusses 10 such that joists 20 are oriented substantially perpendicular with respect to adjacent trusses 10. The intervals between adjacent joists 20 may vary, but are typically in the range from 10 to 22 inches, depending upon the load characteristics of the particular building structure. A plurality of wooden membranes, such as plywood webs (not shown), may be positioned over wood joists 20 to define a floor or ceiling panel. Joists 20 may be of various sizes from 2×4 to 4×6 size lumber. Top and bottom chords 12 and 14 and web members 16 of truss 10 may also be comprised of lumber of various sizes. In the example illustrated in FIG. 1 top and bottom chords 12 and 14 are each comprised of two pieces of 2×4 size lumber and each web member 16 is comprised of a single piece of 2×4 size lumber.

Figure 2:
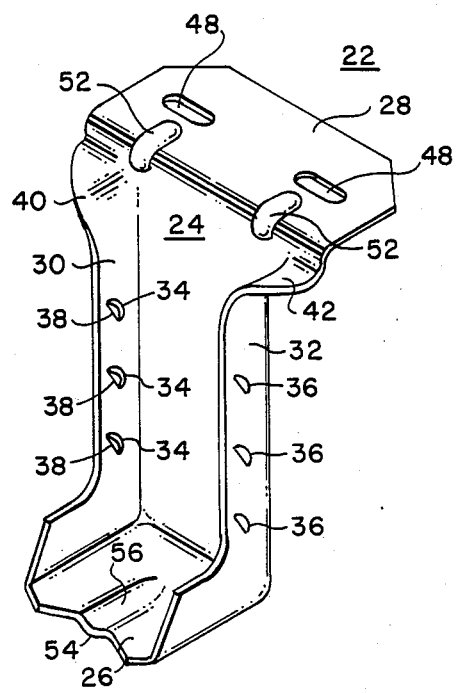
FIG. 2 is a perspective view of a first embodiment of the hanger device according to the present invention.
Figure 3:
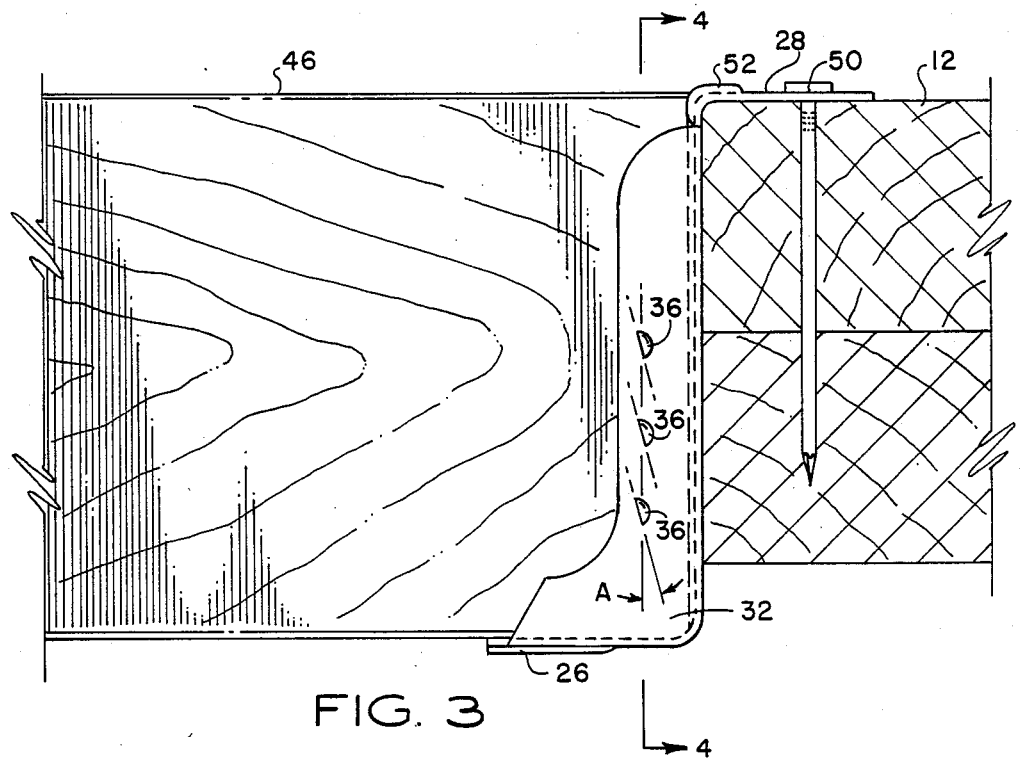
FIG. 3 is a side elevation view of a portion of the truss, illustrating the connection of a wood joist to the truss by means of the hanger device according to the present invention.

A hanger device 22 is used to connect one end of each joist 20 to top chord 12 of corresponding truss 10 and to support the panel defined by adjacent ones of wood joists 20 and the corresponding plywood web. As best seen in FIG. 2, device 22 is comprised of a relatively flat central member 24, a relatively flat base member 26 protruding from central member 24 adjacent to a first end thereof and a relatively flat flange member 28 protruding from central member 24 adjacent to a second end thereof, opposite from the first end of central member 24. Both base member 26 and flange member 28 are oriented substantially perpendicular to central member 24, but protrude in opposite directions from central member 24. First and second walls 30 and 32 extend along respective opposite sides of central member 24 and base member 26, such that walls 30 and 32 cooperate with central member 24 and base member 26 to define a saddle-shaped structure with a recessed region therebetween, which is enclosed on three sides by walls 30 and 32 and central member 24.

Device 22 is preferably die-formed from galvanized steel having a thickness range between 0.036 inch and 0.059 inch. In one embodiment the length of central member 24 along its major axis is on the order of 3½" and the width along its minor axis is on the order of 1½". The dimensions of flange member 28 are approximately 2½" along an axis parallel to the minor axis of central member 24 and approximately 1¼" along an axis perpendicular to a major surface of central member 24. The dimensions of base member 26 are approximately 1½" along an axis parallel to the minor axis of central member 24 and approximately 1⅜" along an axis perpendicular to a major surface of central member 24. One skilled in the art will recognize that these dimensions will vary depending upon the size of the joist being received within the recessed region and the load being supported by device 22.

In accordance with the present invention, device 22 is provided with a self-gripping feature by forming a plurality of projections 34 on respective inwardly facing major surfaces of walls 30 and 32. In one aspect of the invention, projections 34 are formed by extruding selected portions of walls 30 and 32 into the recessed region defined by walls 30 and 32 and central member 24. This extrusion process defines a plurality of openings 36 adjacent to each projection 34. Each projection 34 has a curved major surface, which defines a portion of a substantially spherical surface and each opening 36 has a substantially semi-circular cross-section so that each projection 34 appears to have a substantially "half-moon" shape.

In another aspect of the invention, projections 34 are oriented diagonally relative to respective major axes of the corresponding walls 30 and 32. As such, a chord 38 extending between end points on a curve defining an intersection between the corresponding projection 34 and the corresponding wall 30 or 32 is oriented diagonally at an angle A (see FIG. 3) with respect to the major axis of the corresponding wall 30 or 32. For example, angle A may be on the order of 15 degrees, but may vary depending upon how the particular device 22 is formed. Furthermore, the angle of orientation may be different for each projection 34, as will be described in greater detail hereinafter. On the respective inwardly facing major surfaces of walls 30 and 32 openings 36 lie between the distal edges of the respective projections 34 and the respective chords 38.

Figure 4:
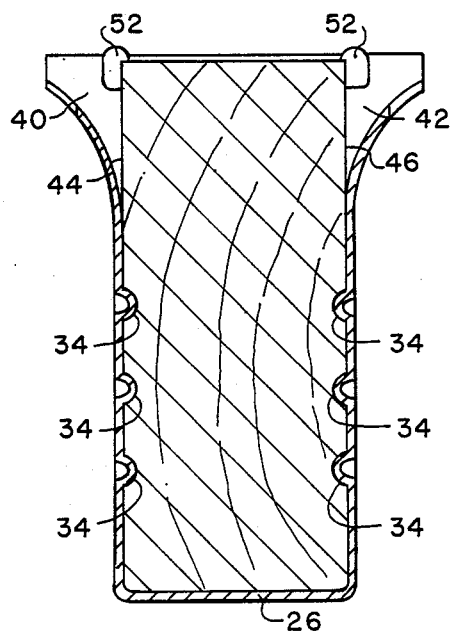
FIG. 4 is a sectional view, taken along the line 4—4 in FIG. 3, illustrating the gripping action of the hanger device on the wooden joist.

Respective portions 40 and 42 of walls 30 and 32 adjacent to the intersection between central member 24 and flange member 28 are tapered downwardly to facilitate the insertion of an end portion of joist 20 into the recessed region of device 22. Joist 20 is secured to device 22 by first positioning a lower portion of joist 20 between tapered portions 40 and 42 of walls 30 and 32 and exerting a downwardly directed force to move joist 20 downwardly along the major axis of central member 24 until the end portion of joist 20 is substantially completely received within the recessed region defined by central member 24, walls 30 and 32 and base member 26. When central member 24 has a length along its major axis of approximately 3½" and a width along its minor axis of approximately 1½", then device 22 is suitable for receiving a 2×4 size joist 20. Projections 34, however, reduce the width of the recessed region below 1½" by an amount equal to twice the distance by which each projection 34 protrudes into the recessed region along an axis which is perpendicular to the plane of the corresponding inwardly facing surface of the corresponding wall. The distal edge of each projection 34 is sharp enough to penetrate into respective opposite major surfaces 44 and 46 (see FIGS. 3 and 4) of joist 20 as joist 20 is driven downwardly into the recessed region of device 22. The gripping action of device 22 is best illustrated in FIG. 4. The diagonal orientation of projections 34 with respect to the major axes of walls 30 and 32 and the curved surfaces of projections 34 enhance the gripping action of projections 34 to prevent joist 20 from being dislodged from device 22 by vertical movement along a major axis of central member 24 or lateral movement along an axis perpendicular to a plane defined by a major surface of central member 24.

In another embodiment, which is not illustrated herein, each projection on a particular wall is oriented at a different angle from the other projections on that particular wall, relative to a major axis of the wall so the chord associated with each projection is oriented along a different axis, which further enhances the gripping action of the device 22 on the corresponding joist.

Referring to FIG. 2, flange member 28 has a pair of elongated openings 48 therein for receiving attachment members such as nails 50 (see FIG. 1) to secure device 22 to top chord 12 of truss 10. Two rib members 52 are disposed at least partially on flange member 28 and central member 24 to strengthen the steel material defining the intersection between flange member 28 and central member 24. Similarly, a third rib member 54 is disposed on an outer surface of base member 26 to strengthen the metal material defining base member 26.

Rib member 54 defines an indentation 56 on an inner major surface of base member 26.

The hanger device according to the present invention eliminates the need for nails or other attachment members to be used to secure the device to a wood construction member such as a floor or ceiling joist, thereby substantially reducing the labor and material cost associated with the building structure. A hanger device similar to the embodiment described above with reference to FIGS. 1–4 is manufactured and sold by Truswal Systems Corporation, of Irving, Tex., under Part No. TF24. Test results have borne out the effectiveness of the hanger device described above. In one test a hanger device of the type described above with reference to FIGS. 1–4 was tested by Smith Emery Testing Laboratory in accordance with the "Recommended Testing Procedure for Evaluation of Joist Hangers and Similar Devices". A hanger device was attached at each end of a 20" length of a 2×4 wood joist and fastened to two 32" long 4×6 headers with two 10-penny, 1½" long nails through the top flange of each hanger device. Ultimate failure in all cases occurred by one or both of the hanger devices tending to straighten and pull the nails out of the support headers, not by the joists becoming disengaged from the hanger devices.

Figure 5:
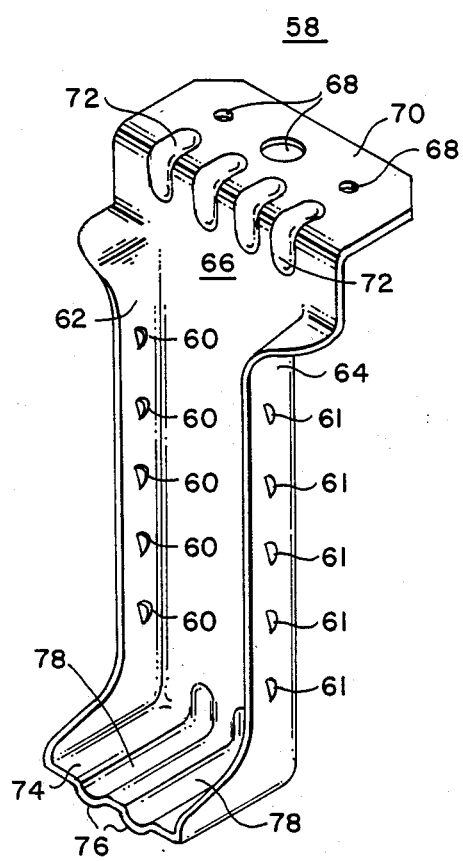
FIG. 5 is a perspective view of a second embodiment of the hanger device according to the present invention.

Another embodiment of the hanger device according to the present invention is illustrated in FIG. 5. Hanger device 58 illustrated in FIG. 5 is substantially the same as hanger device 22 described above with reference to FIGS. 1–4, except that hanger device 58 has five projections 60 and five openings 61 on each side wall 62 and 64, instead of three, and the length of central member 66 along its major axis is on the order of 5⅛" instead of 3⅛". As such, hanger device 58 is adapted for receiving wood joists of 2×6 size instead of the 2×4 size for which hanger device 22 is suitable. Hanger device 58 also has three openings 68 in flange member 70 for receiving nails or other attachment members to secure device 58 to a wood construction member such as the top chord of a truss or the like and four rib members 72 disposed at least partially on flange member 70 and central member 66 to strengthen the metal material defining the intersection between flange member 70 and central member 66. Base member 74 of hanger device 58 has two rib members 76 disposed on an outer major surface thereof to strengthen the metal material comprising base member 74. Rib members 76 define respective indentations 78 on an inner major surface of base member 74. One skilled in the art will recognize that the dimensions of the hanger device according to the present invention can be varied to conform to the size of the framing members which are attached thereto. Although the preferred embodiment of the invention is described with reference to the connection between wood joists and trusses, the hanger device according to the present invention is well-suited for connecting wooden framing members of various types to wooden support members and is not limited in its utility to connecting wood joists to trusses.

Various embodiments of the invention have now been described in detail. Since it is obvious that changes in and additions to the above-described preferred embodiment may be made without departing from the nature, spirit and scope of the invention, the invention is not to be limited to said details, except as set forth in the appended Claims.

What is claimed is:

1. A hanger device having a back wall, first and second opposed side walls protruding from the back wall to define a recessed region for receiving a portion of a construction member, and a base member protruding from the back wall in substantially the same direction as the first and second side walls to provide a seat for the construction member, wherein the improvement comprises at least one pair of opposed projections extending into the recessed region from the respective first and second side walls, said projections being medially disposed on the respective side walls between the back wall and respective distal edges of the side walls, each of said projections having a surface curving downwardly and inwardly from the corresponding side wall into the recessed region for urging the construction member downwardly into the recessed region.

2. The device according to claim 1, wherein each projection is formed by extruding selected portions of the corresponding side wall into the recessed region to define a corresponding opening in the wall adjacent to the corresponding projection.

3. The device according to claim 1 wherein each of said side walls has an opening therein adjacent to a corresponding one of said projections.

4. The device of claim 1 wherein a distal edge of the curved surface of each projection defines a curve extending from a first position on the corresponding side wall into the recessed region and back toward the corresponding side wall and terminating at a second position on the corresponding side wall.

5. The device according to claim 1 wherein said curved surface of each projection defines a portion of a substantially spherical surface.

6. The device according to claim 5 wherein each of said openings has a substantially semi-circular cross-section.

7. The device according to claim 1 further including a flange member protruding from said back, wall in a direction opposite from the direction in which said base member protrudes from said back wall, said flange member for being attached to a support member to interconnect the construction member and the support member.

8. The device according to claim 7 wherein said base member and said flange member both have at least one rib member on respective major surfaces thereof to enhance the structural integrity of the device.

9. The device according to claim 7 wherein said flange member has a plurality of openings therein for receiving an attachment member to secure said device to said support member.

10. The device according to claim 1 wherein a portion of each side wall adjacent to a top part of said back wall is tapered toward a bottom part of said back wall.

11. The device according to claim 1 wherein each projection is oriented diagonally with respect to a major axis of the corresponding side wall.

12. The device according to claim 11 wherein the curved surface of each projection is oriented such that a chord extending between end points on a curve defining an intersection between the particular projection and the corresponding side wall is oriented diagonally with respect to the major axis of the corresponding side wall.

13. The device according to claim 12 wherein an opening in the corresponding wall is disposed between a curved distal edge of each projection and the corresponding chord.

14. The device according to claim 13 wherein each of said side walls has a plurality of projections extending into said recessed region, each of said projections on a particular side wall being oriented at a different angle from the other projections on the particular side wall relative to a major axis of the side wall.

15. A hanger device having a back wall, first and second opposed side walls protruding from the back wall to define a recessed region for receiving a portion of a construction member and a base member protruding from the back wall to provide a seat for said construction member, wherein the improvement comprises at least one pair of opposed projections extending into said recessed region from the respective first and second side walls, each projection having a surface curving inwardly and downwardly from the corresponding side wall into the recessed region to urge the construction member downwardly into the recessed region.

16. The device according to claim 15 wherein each of said projections is formed by extruding selected portions of the corresponding side wall into the recessed region to define a corresponding opening in the side wall adjacent to the corresponding projection.

17. The device according to claim 16 wherein the curved surface of each projection defines a portion of a substantially spherical surface and each of said openings in said side walls has a substantially semi-circular cross-section.

18. The device according to claim 17 wherein the curved surface of each projection is oriented such that a chord extending between end points on a curve defining an intersection between the particular projection and the corresponding side wall is oriented diagonally with respect to a major axis of the corresponding side wall.

19. The device according to claim 18 wherein each opening in the corresponding side wall is disposed between a curved distal edge of the corresponding projection and the corresponding chord.

20. The device according to claim 19 wherein each of the projections on a particular side wall is oriented at a different angle from the other projections, on the particular side wall, relative to the major axis of the side wall.

21. A hanger device for connecting a first wood member to a second wood member of a building structure such that said first wood member is oriented substantially perpendicular to said second wood member, said device having a relatively flat central member, a base member and first and second oppositely positioned walls protruding from said central member to define a recessed region for receiving a portion of said first wood member and means for attaching the device to a second wood member, wherein the improvement comprises at least one projection disposed on respective inwardly facing surfaces of both the first and second walls, said projections having respective curved surfaces extending downwardly and inwardly from the respective walls into the recessed region for being embedded into the first wood member to attach the first wood member to the device.

22. The device according to claim 21 wherein each projection is formed by extruding selected portions of the corresponding wall, positioned medially between the central member and the distal edge of the corresponding wall, into the recessed region to define a corresponding opening in the wall adjacent to the corresponding projection.

23. The device according claim 21 wherein the means for attaching the device to the second wood member is comprised of a flange member protruding outwardly from the central member in a direction opposite from the direction in which the base member and the first and second walls protrude from the central member.

24. The device according to claim 21 wherein the curved surface of each projection defines a portion of a substantially spherical surface and each of said openings in said walls has a substantially semi-circular cross-section.

25. The device according to claim 24 wherein the curved surface of each projection is oriented such that a chord extending between end points on a curve defining an intersection between the particular projection and the corresponding wall is oriented diagonally with respect to a major axis of the corresponding wall.

26. The device according to claim 25 wherein each opening in the corresponding wall is disposed between a curved distal edge of the corresponding projection and the corresponding chord.

27. The device according to claim 21 wherein each wall has a plurality of projections disposed thereon, each of the projections on a particular wall being oriented at a different angle from the other projections on that particular wall, relative to a major axis of the wall.

* * * * *